US012809874B2

(12) United States Patent
Veasey et al.

(10) Patent No.: US 12,809,874 B2
(45) Date of Patent: Nov. 24, 2026

(54) SEARCH SYSTEM FOR QUANTIZATION OF VECTOR INDICES AND EFFICIENT MULTI-GRAPH SEARCHING AND MERGING

(71) Applicant: Elasticsearch B.V., Amsterdam (NL)

(72) Inventors: Thomas James Veasey, York (GB); Benjamin Whitefield Trent, Greer, SC (US); Jim Ferenczi, London (GB); Christopher Hegarty, Stamullen (IE); Mayya Sharipova, North York (CA)

(73) Assignee: Elasticsearch B.V., Amsterdam (NL)

( * ) Notice: Subject to any disclaimer, the term of this patent is extended or adjusted under 35 U.S.C. 154(b) by 0 days.

(21) Appl. No.: 19/019,053

(22) Filed: Jan. 13, 2025

(65) Prior Publication Data

US 2025/0231948 A1 Jul. 17, 2025

Related U.S. Application Data

(60) Provisional application No. 63/620,435, filed on Jan. 12, 2024.

(51) Int. Cl.
*G06F 16/00* (2019.01)
*G06F 16/22* (2019.01)
(Continued)

(52) U.S. Cl.
CPC ...... *G06F 16/2457* (2019.01); *G06F 16/2228* (2019.01); *G06F 16/24526* (2019.01);
(Continued)

(58) Field of Classification Search
CPC ............. G06F 16/2457; G06F 16/2228; G06F 16/951; G06F 16/532; G06F 16/9038; G06F 16/901; G06F 16/2453; G06F 16/24526; G06F 16/2264; G06F 16/90335; G06F 17/16; G06F 8/34; G06F 8/36; G06F 3/0481; G06F 3/04812; G06F 3/04815
See application file for complete search history.

(56) References Cited

U.S. PATENT DOCUMENTS 8,547,437 B2 * 10/2013 Buehler ........... G08B 13/19608 348/172
2003/0107599 A1 * 6/2003 Fuller ....................... G06F 8/34 715/763
(Continued)

FOREIGN PATENT DOCUMENTS

WO WO 2006076638 A2 * 7/2006

OTHER PUBLICATIONS

Eduardo Rinaldi et al., "NodeGit: Diffing and Merging Node Graphs", ACM Transactions on Graphics (TOG), vol. 42, Issue 6 Article No. 265, pp. 1-12.*
(Continued)

*Primary Examiner* — Srirama Channavajjala
(74) *Attorney, Agent, or Firm* — Brake Hughes Bellermann LLP

(57) ABSTRACT

According to an aspect, a search system is provided that executes quantization techniques and/or multi-graph searching and/or merging techniques that may increase the speed of searching and/or indexing while reducing the amount of computing resources that are used to perform these computer tasks as compared with conventional approaches.

13 Claims, 12 Drawing Sheets

(51) Int. Cl.

| | |
|---|---|
| ***G06F 16/2452*** | (2019.01) |
| ***G06F 16/2453*** | (2019.01) |
| ***G06F 16/2457*** | (2019.01) |
| ***G06F 16/903*** | (2019.01) |
| ***G06F 16/9038*** | (2019.01) |
| ***G06F 16/951*** | (2019.01) |
| ***G06F 17/16*** | (2006.01) |

(52) U.S. Cl.
CPC .... *G06F 16/2453* (2019.01); *G06F 16/90335* (2019.01); *G06F 16/9038* (2019.01); *G06F 16/951* (2019.01); *G06F 17/16* (2013.01)

(56) References Cited

U.S. PATENT DOCUMENTS

2006/0074870 A1* 4/2006 Brill .................... G06F 16/3328 707/999.005
2006/0190105 A1* 8/2006 Hsu ........................... G06F 8/34 700/86
2012/0330864 A1* 12/2012 Chakrabarti .......... G06F 16/951 706/13
2015/0039575 A1* 2/2015 Helak ..................... G06F 16/21 707/696
2018/0349512 A1* 12/2018 Tian .................... G06F 16/9027
2021/0124780 A1* 4/2021 Silva ..................... G06F 18/217
2023/0205822 A1* 6/2023 Simhadri ............ G06F 16/9035 707/798
2024/0095241 A1* 3/2024 Zheng ................. G06F 16/9024
2025/0061136 A1* 2/2025 Saini ...................... G06N 3/045

OTHER PUBLICATIONS

Hung T. Nguyen et al., "Detecting Anomalous Graphs in Labeled Multi-Graph Databases", ACM Transactions on Knowledge Discovery from Data, vol. 17, Issue 2 Article No. 16, pp. 1-25.*

* cited by examiner

SEARCH SYSTEM FOR QUANTIZATION OF VECTOR INDICES AND EFFICIENT MULTI-GRAPH SEARCHING AND MERGING

CROSS-REFERENCE TO RELATED APPLICATION

This application claims the benefit of and priority to U.S. Provisional Application No. 63/620,435, filed Jan. 12, 2024, which is incorporated by reference herein in its entirety.

DESCRIPTION

An index (e.g., index vectors) may be used to store representations of data (e.g., structured data or, in some examples, unstructured data). Machine-learning (ML) model(s) may generate index vectors, and these index vectors are learned such that the distance between the index vectors may map to certain properties. For example, text can be represented by the index vectors where neighboring index vectors are semantically similar. Some vector search algorithms (e.g., Hierarchical Navigable Small World (HNSW)) use a multi-layered graph structure to efficiently locate approximate nearest neighbors (ANNs) in high-dimensional data spaces, and these vector search algorithms may store the vectors in memory so that they are accessible when traversing a graph. Quantization techniques can be applied to approximate such vectors in a space efficient manner. However, some conventional quantization techniques may still require relatively high memory storage requirements and/or may have lower accuracy of representing the underlying data.

In some examples, when building index vectors, a single graph is generated with the index vectors. In some examples, the index vectors are built with multiple graphs. Some conventional search algorithms that search in a single graph may be computationally inefficient. Some conventional indexing algorithms that merge multiple graphs may be relatively complex and use increased computing resources.

SUMMARY

In some aspects, the techniques described herein relate to a method including: identifying, using an optimization solver, one or more quantization constants for quantizing a vector in a graph of a search system; generating a quantized vector of the vector using the quantization constants.

In some aspects, the techniques described herein relate to a method including: computing a similarity distance between a first quantized vector and a second quantized vector stored in a search system; estimating an error approximation based on metadata associated with the first quantized vector and metadata associated with the second quantized vector; and updating the similarity distance based on the error approximation.

In some aspects, the techniques described herein relate to a method including: receiving vector segments to merge; receiving one or more system constraints; identifying an indexing strategy based on the one or more system constraints; and generating a merged segment for the vector segments using the indexing strategy.

In some aspects, the techniques described herein relate to a method including: receiving a user query for a vector search on a first graph and a second graph; executing a first search on the first graph and a second search on the second graph; at an interval, broadcasting a first message about the first search to the second graph and broadcasting a second message about the second search to the first graph; and updating the first search and the second search based on the second message and the first message, respectively.

In some aspects, the techniques described herein relate to a method including: identifying a first graph and a second graph to merge; adding a subset of vectors from the second graph to the first graph; for a first vector in the second graph not added to the first graph, identify neighbor vectors in the first graph and the second graph using neighbors of the first vector included in the subset; and adding the neighbor vectors to the first graph.

DETAILED DESCRIPTION

This disclosure relates to a search system that executes quantization techniques and/or multi-graph searching and/or merging techniques that may increase the speed of searching and/or indexing while reducing the amount of computing resources that are used to perform these computer tasks as compared with conventional approaches. In some examples, the search system may automatically select one or more quantization constants which may improve the efficiency of obtaining search results (e.g., nearest neighbor queries of a query vector). In some examples, the search system implements a quantization strategy that can improve the accuracy of a distance calculation for a fixed compression ratio and/or may increase compression of vectors without loss of retrieval accuracy (or minimized loss), thereby reducing the amount of memory requirements. In some examples, the search system may implement an adaptive indexing strategy for storing vectors when graphs are merged in a manner that is computationally more efficient than conventional approaches. In some examples, the search system may execute a parallel graph search that is computationally more efficient than conventional approaches. In some examples, the search system may execute a graph merging mechanism for merging multiple graphs that is computationally more efficient than conventional approaches.

Figure 1A:
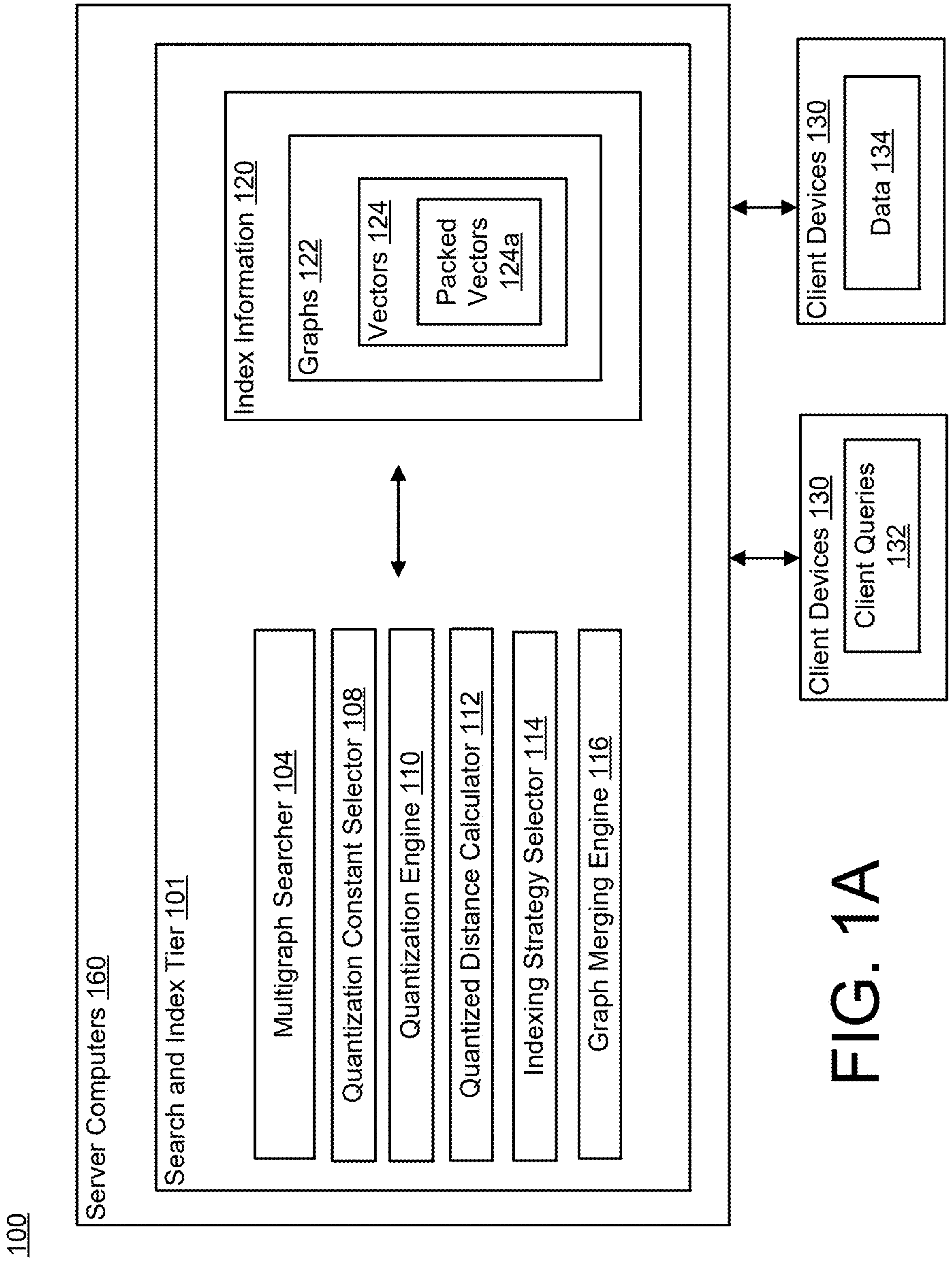
FIG. 1A illustrates a search system according to an aspect.
Figure 1B:
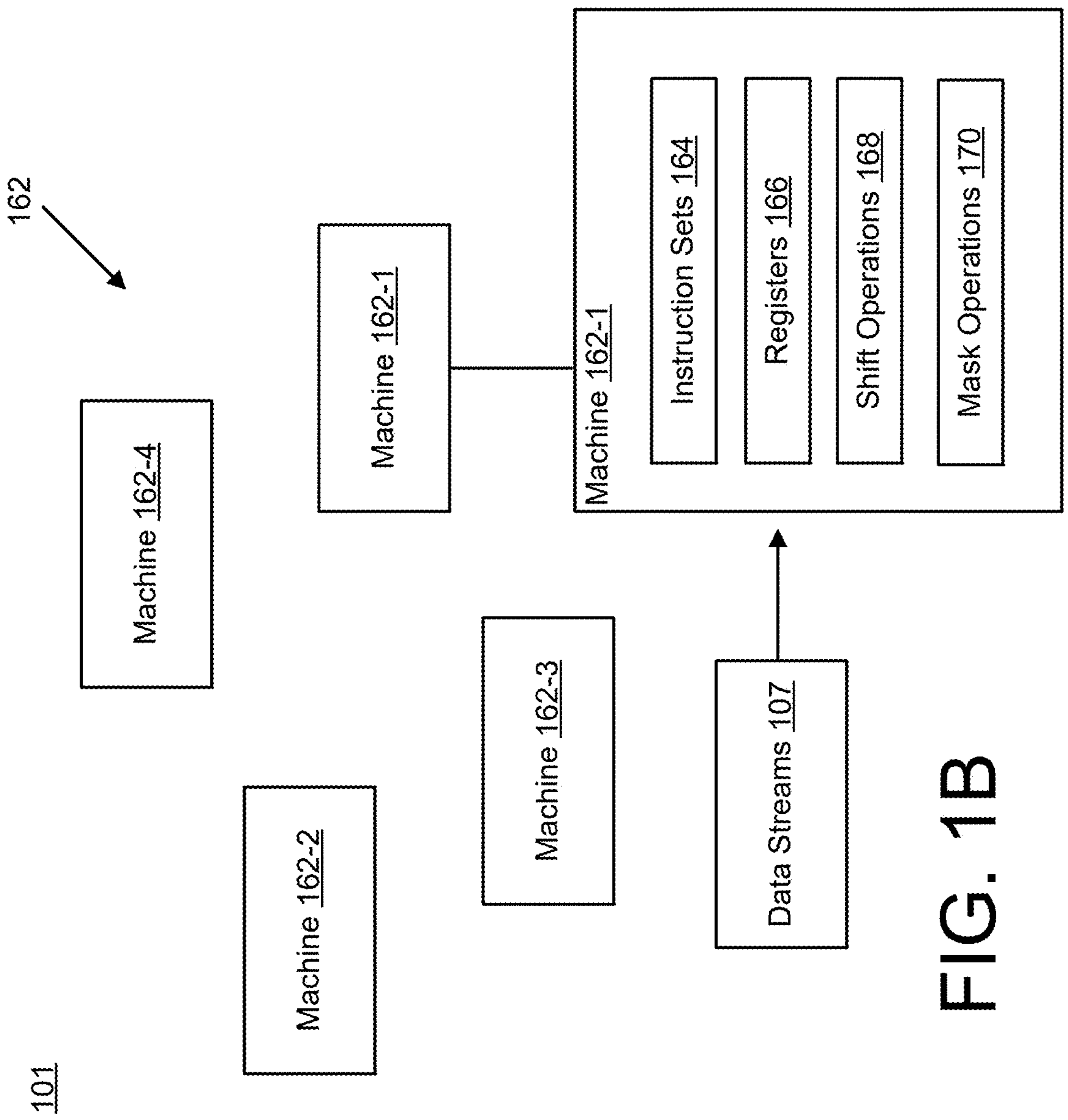
FIG. 1B illustrates a distributed computing system of a search system according to an aspect.

FIGS. 1A and 1B illustrate an example of a search system 100 according to an aspect. In some examples, the search system 100 is a search and analytics engine. In some examples, the search system 100 is an indexing and search engine. In some examples, the search system 100 is an indexing, search, and analytics engine. The search system 100 includes a search and index tier 101. The search and index tier 101 may be a single layer or multiple layers for managing and storing index information 120 and searching using the index information 120. In some examples, the search and index tier 101 include common computer resources (e.g., CPU, memory) that are shared between indexing and searching operations. In some examples, the search and index tier 101 include computer resources for indexing that are separate from the computer resources for searching, thereby allowing a search tier and an index tier to be independently scaled.

The search and index tier 101 may be executable by one or more server computers 160. The search and index tier 101 may communicate with one or more client devices 130. In some examples, the search and index tier 101 may receive data 134 (e.g., new data) to be indexed by the search and index tier 101. In some examples, the search and index tier 101 may receive a client query 132 from a client device 130, and the search and index tier 101 may identify (and return) one or more search results responsive to the client query 132 by searching the index information 120.

The search and index tier 101 may include one or more indexing engines, one or more searching engines, and one or more local storage devices (e.g., local disks, buffers). In some examples, the search and index tier 101 include a distributed computing system. In some examples, as shown in FIG. 1B, the search and index tier 101 includes a plurality of machines 162 (e.g., computing devices) that are in communication with each other. The machines 162 may include a machine 162-1, a machine 162-2, a machine 162-3, a machine 162-3, and a machine 162-4. Although four machines 162 are illustrated in FIG. 1B, the search system 100 may include any number of machines 162. In some examples, a machine 162 is referred to as a node, which may be an indexing node or a search node. A machine 162 includes one or more processors and one or more local storage devices.

The search and index tier 101 may receive (e.g., ingest) data 134 (e.g., documents) from one or more client devices 130. The search and index tier 101 may generate one or more index structures about the data 134 and store the index structures in the index information 120. The index information 120 includes one or more index structures about the data stored by the search and index tier 101. In some examples, the index information 120 includes one or more graphs 122 storing vectors 124. In some examples, the vectors 124 are referred to as index vectors. The graphs 122 may be used by the search and index tier 101 to efficiently find the documents that are relevant to a particular client query 132. The type of index structure is dependent upon the type of documents ingested by the search and index tier 101, but may generally include a document identifier, document type, timestamp, index terms, ranking, etc.

Figure 2:
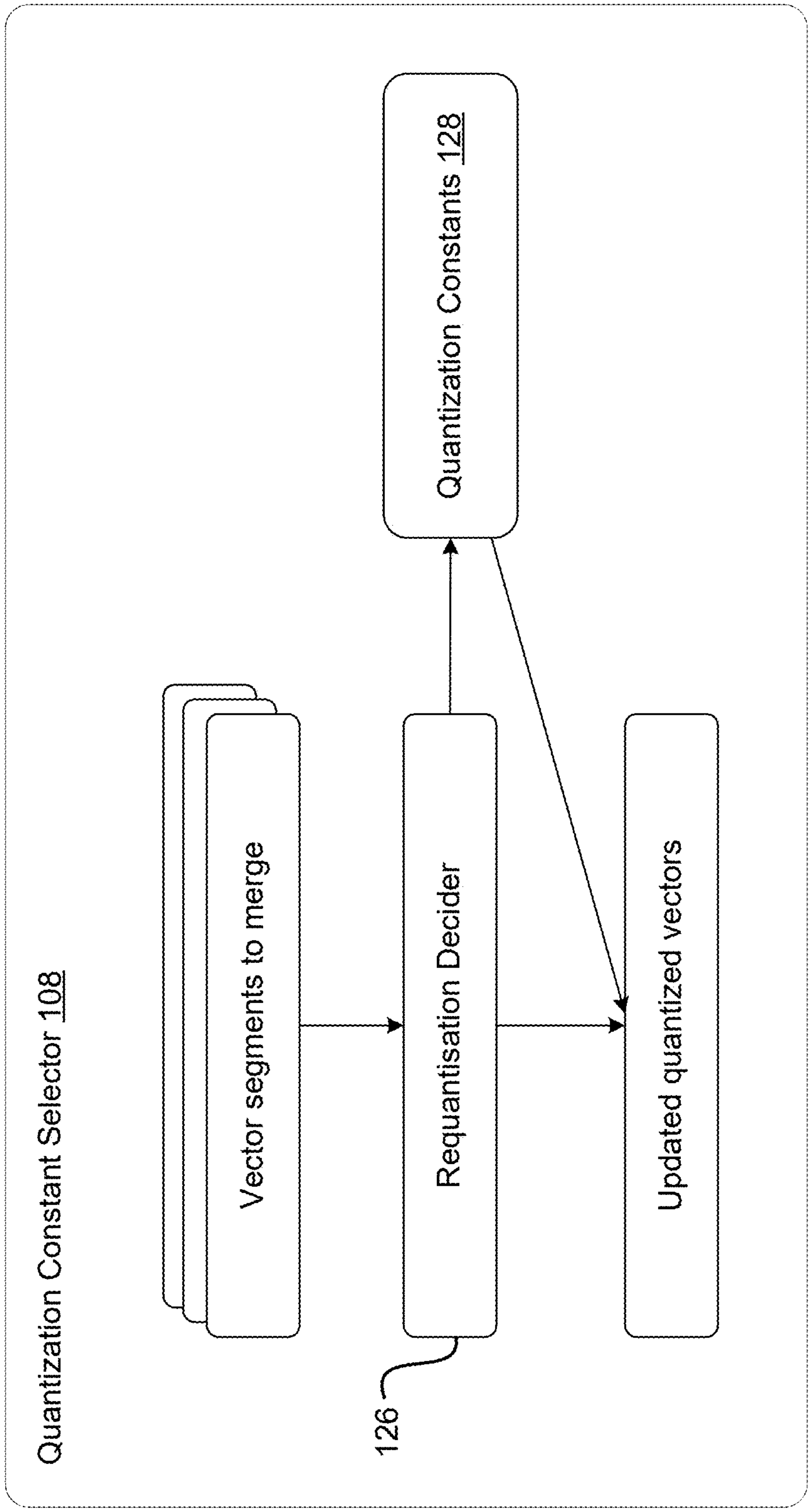
FIG. 2 illustrates an example of a quantization constant selector according to an aspect.

In some examples, the search system 100 includes a quantization constant selector 108 configured to automatically select one or more quantization constants 128, which are used by a quantized distance calculator 112 to determine the similarity of vectors 124 to a vector query. FIG. 2 illustrates an example of the quantization constant selector 108. Referring to FIG. 2, the quantization constant selector 108 includes a re-quantization decider 126 configured to receive vector segments to merge and generate values for the quantization constraints 128, which are used to update the quantized vectors. In some examples, a vector segment is a component of a vector 124, and a vector 124 may have multiple components.

For example, in a floating point representation of a vector 124, each of its components (e.g., vector segments) is represented by a floating point number (e.g., a thirty-two bit institute of electrical and electronics engineers (IEEE) floating point number). The search and index tier 101 includes a quantization engine 110 configured to execute scalar quantization, which includes converting floating point numbers into integers with bits (e.g., b bits). In some examples, scalar quantization may be executed based on the following transformation:

$$x \mapsto \lfloor (2^b - 1)(\text{clamp}(x, l, u) - l)/(u - l) \rceil \quad \text{Eq. (1)}$$

The operator $\lfloor \cdot \rceil$ is a rounding operation that rounds to the nearest integer and clamp (x, l, u) is a function that restricts an argument x to the interval [l, u]. As further described below, the quantization constants 128 (e.g., l and u) may be selected by the quantization constant selector 108.

Since the result of this transformation (e.g., Eq. (1)) is an integer in the range $[0, 2^b]$, the result can be represented by a b bit unsigned integer. In some examples, the quantization constants 128 are used to map components (e.g., every component) of a vector 124 to an integer, and a quantized distance calculator 112 may compute (e.g., directly compute) the distance between vectors 124 from their quantized representation. The variable $x_q$ is the result of quantizing a floating point vector x, and Eq. (1) may be expressed with the vector's components as follows:

$$x = l + \frac{u - l}{2^b - 1} x_q \quad \text{Eq. (2)}$$

A vector l is a vector with components l. In some examples, vector proximity may use cosine or dot product distance metrics. Cosine distance may reduce to a dot product if each floating point vector is normalized. Although some aspects discuss dot product distance, the search system 100 may use cosine product distance metrics. The dot product distance between vector x and y may be defined by $x^t y$. Substituting from Eq. (2) and denoting $$\alpha = \frac{u - l}{2^b - 1},$$

this gives:

$$x^t y = (l + \alpha x_q)^t (l + \alpha y_q) = l^t l + \alpha l^t (x_q + y_q) + \alpha^2 x_q^t y_q \quad \text{Eq. (3)}$$

The first term of the right-hand side (RHS) is a constant, and the second term depends (e.g., depends only) on a single vector and can be pre-computed and stored with each vector as a single float. As such, the quantized distance calculator 112 may compute the distance between any two vectors can be computed by correcting the dot product of their quantized vectors using Eq. (3).

As indicated above, the quantization constant selector 108 may select quantization constants 128 (e.g., l and u) to minimize the chance of reordering the dot product between two random vectors in the index information 120. Vector indices may be used for nearest neighbor queries. A nearest neighbor query may search for the closest k vectors or top-k set in the index information 120 for a given query vector y (or sometimes referred to as a query). An error in the vector approximation (e.g., which preserves the order of the vectors' distance to a query vector y, such as a constant shift), may not affect the top-k set. In some examples, the search system 100 may minimize the chance that vectors are reordered on average for a query. In some examples, the search system 100 may not know the query distribution at index time. In some examples, the search system 100 may assume that queries are drawn from the same distribution as the index vectors.

The quantization constant selector 108 may compute the values of the quantization constants, l and u, which may minimize the chance of reordering the dot product between two random vectors 124 in the index information 120. In some examples, the quantization constant selector 108 may compute the values of the quantization constants 128 based on an expected score variance introduced by the quantization. The search system 100 may use $x_q(l, u)$ to denote the quantized version of the vector x as a function of quantization parameters and the quantization constant selector 108 may select values/and u which satisfy the following equation:

$$l^*, u^* = \underset{l,u}{\operatorname{argmin}} \mathbb{E}_{X,Y}\left[\begin{array}{c} \left|X^tY - X_q^t(l, u)Y_q(l, u)\right) - \\ \mathbb{E}_{X,Y}\left[X^tY - X_q^t(l, u)Y_q(l, u)\right)\right]\right|^2 \end{array}\right] \quad \text{Eq. (4)}$$

In some examples, the quantization constant selector 108 may approximate Eq. (4) by selecting random pairs of vector P from the index information 120 and averaging the selected pairs. In some examples, the quantization constant selector 108 may use an optimization solver to identify values of the quantization constants 128 that minimizes a loss (representing the expected score variance introduced by quantization) based on the following equations:

$$\text{loss}(l, u) = \frac{1}{|P|}\sum_{i \in P}\left|\begin{array}{c} x_i^t y_i - x_{q,i}(l, u)y_{q,i}(l, u) - \\ \frac{1}{|P|}\sum_{i \in P} x_i^t y_i - x_{q,i}(l, u)y_{q,i}(l, u) \end{array}\right|^2 \quad \text{Eq. (5)}$$

$$l^*, u^* = \underset{l,u}{\operatorname{argmin}}\,(l, u) \quad \text{Eq. (6)}$$

In some examples, the quantization constant selector 108 may solve Eq. (5) and Eq. (6) using an optimization solver such as a grid search solver or a Bayesian optimization solver. A grid search solver may evaluate the function (e.g., Eq. (5) and Eq. (6)) at a predefined grid of points in the input space and the point with the best output is then considered the optimal solution. A Bayesian optimization solver may use Bayesian statistics to construct a probabilistic model of the function and the model is then used to intelligently select promising points for evaluation, allowing for more efficient exploration of the input space.

Figure 3A:
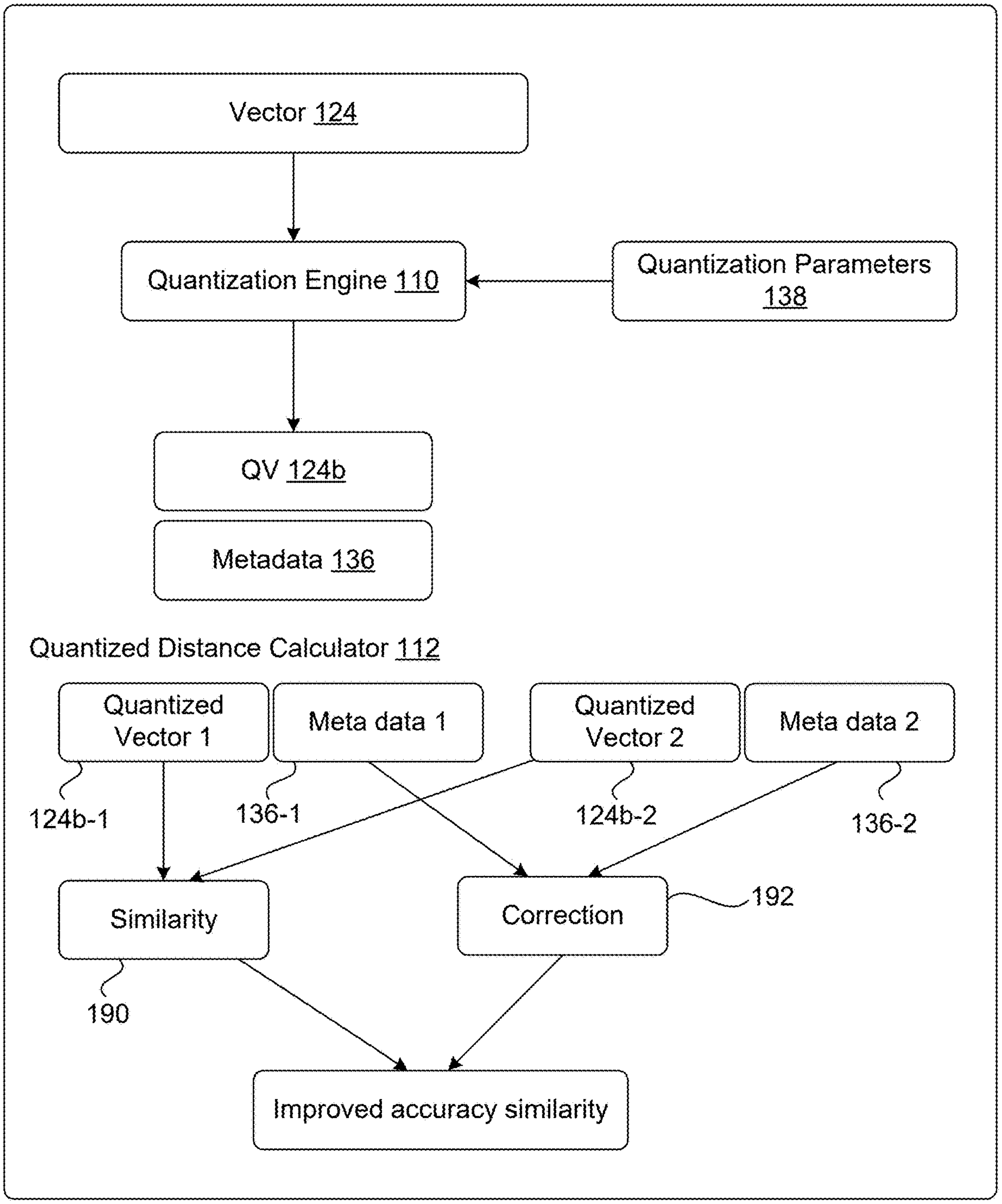
FIG. 3A illustrates aspects of providing quantized distance accuracy using a quantization engine and a quantized distance calculator according to an aspect.

In some examples, the search system 100 may improve quantized distance accuracy (e.g., improving the error analysis in Eq. (3) to obtain a better approximation of the dot product). For example, as shown in FIG. 3A, a quantization engine 110 may receive a vector 124 and generate metadata 136 and a quantized vector 124*b* using quantization parameters 138, which may include the quantization constants 128 selected by the quantization constant selector 108. The quantized distance calculator 112 may execute a similarity function 190 (e.g., compute a distance (e.g., a dot product distance)) between a quantized vector 124*b*-1 and a quantized vector 124*b*-2. The quantized distance calculator 112 may execute a correction function 192 to obtain an approximation error based on metadata 136-1 associated with the quantized vector 124*b*-1 and metadata 136-2 associated with the quantized vector 124*b*-2. The quantized distance calculator 112 may update the result of the similarity function 190 with the result of the correction function 192, thereby providing an improved similarity accuracy.

For example, the dot product distance (e.g., result of the similarity function 190) between two vectors may be expressed as follows:

$$\begin{aligned} x^t y &= (l + x - l)^t(l + y - l) \\ &= l^t l + l^t(y - l + x - l) + (x - l)^t(y - l) \end{aligned} \quad \text{Eq. (7)}$$

The first two terms are functions of a single vector 124. The first two terms can be pre-computed and stored for each vector 124. The third term may be expressed as follows:

$$\begin{aligned} (x - l)^t(y - l) &= (\alpha x_q + x - l - \alpha x_q)^t(\alpha y_q + y - l - \alpha y_q) \\ &= (\alpha x_q + e_x)^t(\alpha y_q + e_y) \\ &= \alpha^2 x_q^t x_q + \alpha e_x^t y_q + \alpha x_q^t e_y + O(|e|^2) \end{aligned} \quad \text{Eq. (8)}$$

In some examples, quantities $e_x = x - l - \alpha x_q$ and $e_y = y - l - \alpha y_q$ may be relatively small. In some examples, the search system 100 may not know the value of either $y_q$ or the vectors $\{x_q\}$ in the index, which may be required to compute $$x_q^t e_y$$

in advance. In some examples, the search system 100 may use the expected values, which may yield:

$$(x - l)^t(y - l) \approx \alpha^2 x_q^t y_q + \alpha\mathbb{E}\left[e_x^t Y_q + X_q^t e_y\right] \quad \text{Eq. (9)}$$

The search system 100 may minimize the approximation error for vectors close to the query vector, e.g., $x_q \approx y_q$. If any distribution for $X_q$ is averaged, this becomes a constant term that may be added to dot products (e.g., all dot products) for the query. This may not affect their order, and, in some examples, the constant term may be discarded.

In some examples, the search system 100 may not derive the query distribution at index time. In some examples, the search system 100 may assume queries are drawn from the same distribution as the vectors in the index. Given typical index data structures, such as an HNSW graph, a search system 100 may quickly extract the near neighbors of a vector. A set of near neighbors of $x_q$ may be denoted by N. Then, for $y_q \approx x_q$, the expectation can be approximated by:

$$\mathbb{E}[e_x^t Y_q] \approx \frac{1}{|N|} \sum_{z_q \in N \cup \{x_q\}} e_x^t z_q \quad \text{Eq. (10)}$$

In some examples, the search system 100 uses a simpler approximation of $$\mathbb{E}[e_x^t Y_q] \approx e_x^t x_q,$$

which may yield the following corrected dot product distance:

$$x^t y \approx \text{constant} + l^t(x - l) + \alpha e_x^t x_q + \alpha^2 x_q^t y_q \quad \text{Eq. (11)}$$

The value $$l^t(x-1) + \alpha e_x^t x_q$$

is a single floating point number. In some examples, the search system 100 may compute the value $$l^t(x-1) + \alpha e_x^t x_q$$

for each vector and may store this value with its quantized representation. The computation and storage of this value may reduce the memory requirements as compared to some conventional approaches.

In some examples, the search system 100 may further improve the approximation of Eq. 11 in the context of a specific nearest neighbor search. In some examples, $\mathbb{E}[Y_q]$ is better approximated when the search system rescales, e.g., $$\mathbb{E}[Y_q] \approx \frac{\|y_q\|}{\|x_q\|}.$$

If the search system 100 stores two floating point numbers instead of one, $$l^t(x - l) \text{ and } \alpha e_x^t / \|x_q\|,$$

the search system 100 can efficiently apply rescaling when the search system computes each dot product. In some examples, the search system 100 applies rescaling for non-normalized vectors. In some examples, the search system 100 does not apply rescaling for cosine distance dot products.

In some examples, the search system 100 may retrieve more than k nearest neighbor vectors, and the search system 100 may re-rank these nearest neighbor vectors using floating point vectors. In some examples, the search system 100 may retrieve the nearest neighbor vectors by reading them from disk.

Figure 3B:
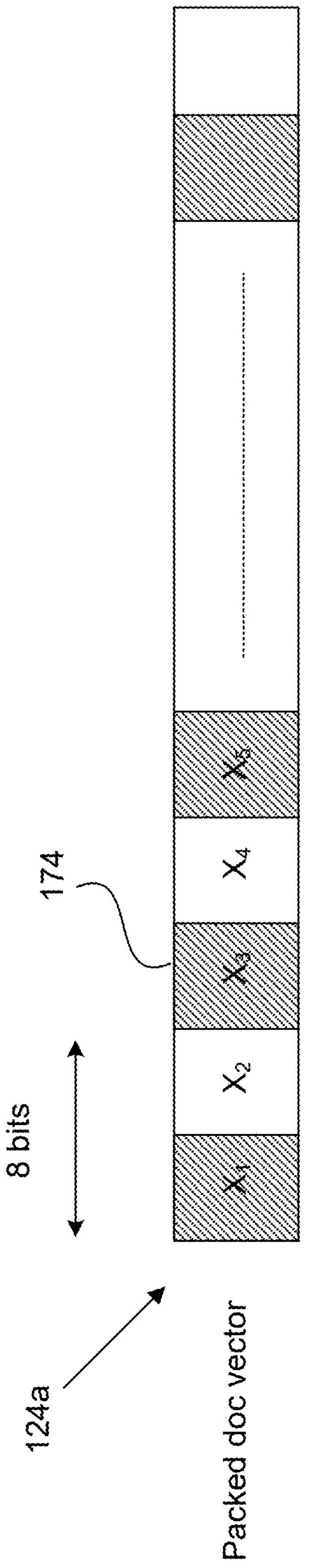
FIG. 3B illustrates an example of a layout of a packed vector according to an aspect.
Figure 3C:
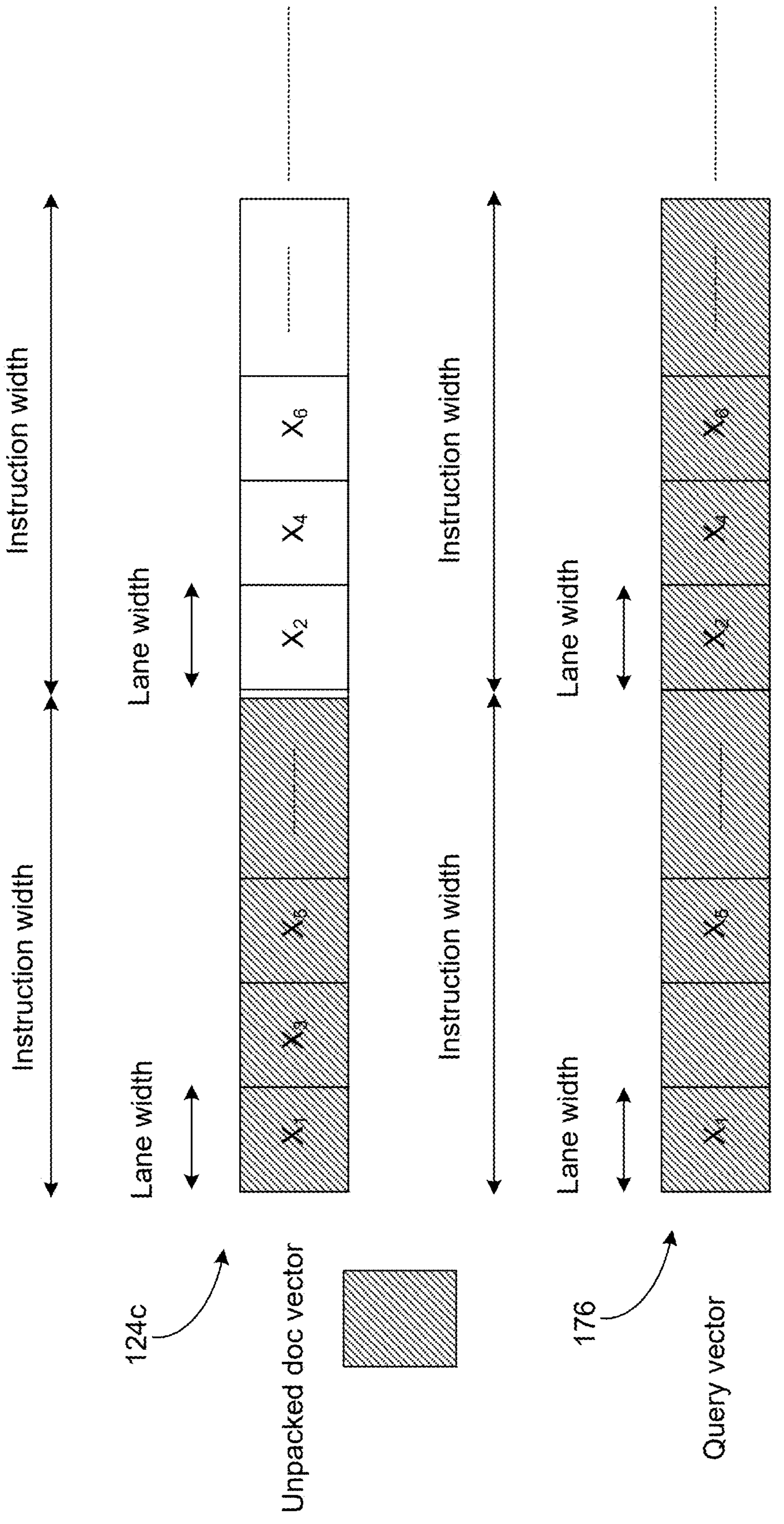
FIG. 3C illustrates examples of a layout of an unpacked vector and a query vector according to an aspect.

In some examples, the search system 100 may store the vectors $\{x_q\}$ in a manner to enable efficient unpacking and computing of dot products with a query vector using instruction sets (e.g., SIMD instruction sets) of variable width (efficient distance calculation for packed quantized vectors). FIG. 3B illustrates an example of a packed vector 124*a* having a packed vector layout 174 with the top four bits (X1) for one component and the bottom four bits (X2) for another component. FIG. 3C illustrates a layout of an unpacked vector 124*c* and a corresponding query vector 176.

If the search system 100 uses fewer than a certain number of bits (e.g., eight bits) to represent each component, the search system 100 may combine the bits into a supported integer data type such as an unsigned integer (e.g., an eight bit unsigned integer). The search system 100 may combine multiple values into a single larger data type (e.g., packing) and extract them back into their individual values (e.g., unpacking) using shift operations 168 and/or mask operations 170. In some examples, unpacking instructions may add overhead to the vector distance calculation, which can be a processing bottleneck in nearest neighbor searching.

To efficiently use computer processing unit (CPU) power, in some examples, the search system 100 may use hardware parallelism. In some examples, as shown in FIG. 1B, the search system may include registers 166 (e.g., wide registers) to provide hardware parallelism. A wide register is a register that can store more data than a standard register. In some examples, a wide register can hold 128, 256, or bits greater than 256. A register 166 may perform a shift operation 168 and/or a mask operation 170. A shift operation 168 may move bits within a data structure to a different position. A mask operation 170 may select or mask out specific bits within a data structure. Registers 166 (e.g., wide registers) may allow the same operation (e.g., a shift operation or a mask operation) to be performed on multiple pieces of data or data streams 107 (also referred to as lanes) at the same time (e.g., at least partially at once). The search system 100 may access the registers 166 using one or more instruction sets 164 (e.g., single instruction, multiple data (SIMD) instruction sets). Generally, if an instruction set 164 uses more data streams 107 (e.g., lanes), the register 166 can perform a higher number of operations per second.

Different processors (e.g., machines 162) have different instruction sets 164, thereby using a number of different data streams 107. In some distributed data stores, segments of the index information 120 can be copied (e.g., freely copied) from one machine 162 to another machine 162. These machines 162 may implement different instruction sets 164. In some examples, the search system 100 is configured to not reindex the data when the search system 100 copies the data. However, the search system 100 may be configured to use the instruction sets 164 with a higher number of data streams 107 to unpack and compute the dot products on a specific machine 162, which, in some examples, may involve finding a single vector representation for indexed vectors 124 to allow the search system 100 to unpack and compute the dot product on them with different width SIMD instructions (e.g., instruction sets 164).

For any permutations of the first d integers I, the following equation is provided:

$$x^t y = \sum_{i=1}^{d} x_i y_i = \sum_{i=1}^{d} x_{\pi(i)} y_{\pi(i)} \quad \text{Eq. (12)}$$

In some examples, the search system 100 may represent vector components using four bit integers. However, the search system 100 may represent vector components using any number of bit counts other than four. In some examples, if the search system 100 uses four bits to represent vector components, the search system 100 may pack two components into each eight bit unsigned integer, e.g., using the top four bits for one component and the bottom four bits for the other. The top four bits can be accessed via a shift right operator and the bottom four bits via an AND with a four bit mask. FIG. 3B illustrates an example of a packed vector 124*a* having a packed vector layout 174 with the top four bits (X1) for one component and the bottom four bits (X2) for another component. In some examples, the search system 100 may store vectors 124 such that the $x_{2i-1}$ components are stored in the top bits of an eight bit unsigned integer and the $x_{2i}$ components in bottom four bits. If the vector dimension is odd, the search system 100 may add a single zero component.

Using this arrangement, the search system 100 may efficiently load the vector 124 into the registers 166 and perform the dot product using instruction sets 164 (e.g., SIMD instructions) for any width instruction by adjusting the query vector representation of the query vector 176. In some examples, adjusting the query vector representation is computationally inexpensive, which may allow the search system 100 to increase hardware parallelism from the SIMD instruction sets (e.g., instruction sets 164) available for the machine 162 where the vector 124 is stored.

To efficiently process the instruction sets 164, the search system 100 may reduce or minimize the number of load instructions used to access the components of the packed vector 124*a*. In some examples, the search system 100 may load contiguous blocks of memory from the vector 124. The maximum width of a register 166 on the machine 162 may be n bits. In some examples, the search system 100 may load n/4 contiguous components of the packed vector 124*a* each time.

For the $j^{th}$ load, the components $$\{x_{(j-1)n/4+1}, x_{(j-1)n/4+3,\ldots,)}x_{jn/4-1}\}$$

are in the top bits and the components $$\{x_{(j-1)n/4+2}, x_{(j-1)n/4+4}, \ldots, x_{jn/4}\}$$

are in the bottom bits of an n bit register 166.

Common SIMD instruction sets 164 provide lane-wise shift operations 168 and mask operations 170. Therefore, to unpack these vectors 124, the search system 100 may apply a single lane-wise right shift operator by a certain number of bits (e.g., four bits) and a single lane-wise AND with the mask 0x0F0F . . . 0F. The results of these two operations are stored in two n bit registers as shown in FIG. 3C.

In some examples, for any number of bits n, the search system 100 can arrange the components of the query vector 176 so that the search system 100 can read them in the same order in which the search system 100 reads the components of the packed vector 124*a*.

The search system 100 may define a permutation function as follows:

$$\pi(i) = 2i - 1, \quad \text{for } i \in \left[\frac{1, 1n}{8}\right] \qquad \text{Eq. (13)}$$

$$\pi(i) = 2\left(i - \frac{n}{8}\right), \quad \text{for } i \in [1n/8 + 1, 2n/8]$$

-continued $$\pi(i) = 2\left(i - \frac{n}{8}\right) - 1, \quad \text{for } i \in [2n/8 + 1, 3n/8]$$

$$\pi(i) = 2\left(i - \frac{2n}{8}\right), \quad \text{for } i \in [3n/8 + 1, 4n/8]$$

In some examples, the search system 100 has a query vector layout based on $x_i \rightarrow x_{\pi(i)}$, the components from the $2j-1^{th}$ and $2j^{th}$ load may correspond to (e.g., match) the components in the unpacked registers 166 from the $j^{th}$ load from the packed vector 124*a*. Using Eq. (12), the search system 100 may perform SIMD multiplication operations on the components to compute the dot product. In some examples, the register width n may be undetermined in the previous discussion, and, in some examples, the same packing scheme operates for any n provided the query layout is adjusted.

Figure 4:
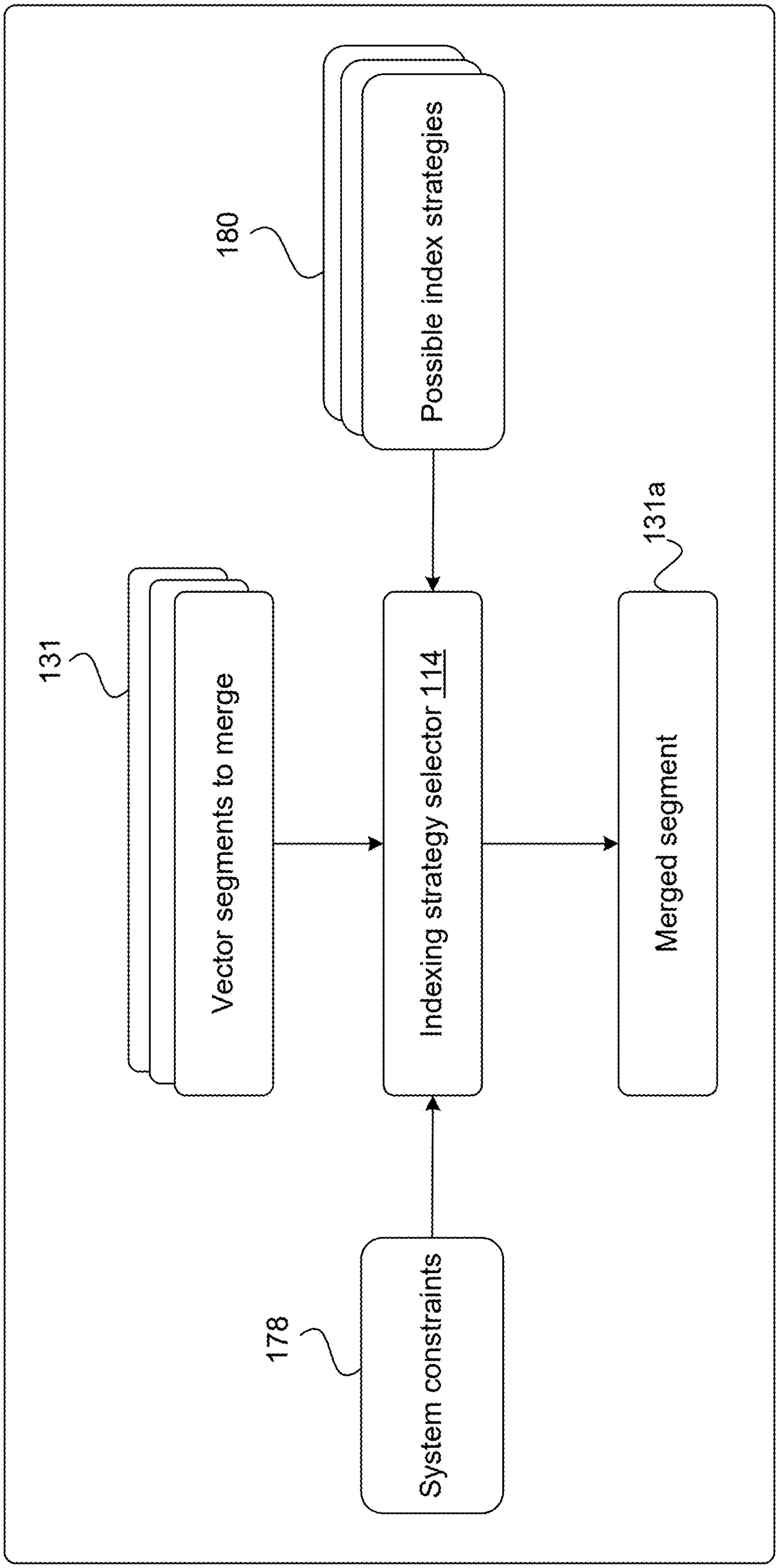
FIG. 4 illustrates an example of an indexing strategy selector according to an aspect.

In some examples, the search system 100 may implement an adaptive indexing strategy for storing vectors 124 when graphs 122 are merged in a manner that is computationally more efficient than conventional approaches. In some examples, the search and index tier 101 includes an indexing strategy selector 114 configured to determine an indexing strategy. For example, as shown in FIG. 4, the indexing strategy selector 114 may receive system constraints 178 and vector segments 131 to be merged and identify an index strategy 180 among a plurality of indexing strategies 180. The search system 100 may merge the vector segments 131 according to the selected index strategy 180, thereby generating a merged segment 131*a*.

In general, an indexing strategy 180 (e.g., an optimal indexing strategy) may change as the amount of data increases. For example, merging graphs 122 (e.g., HNSW graph) may be computationally expensive (e.g., requiring a higher amount of computing resources) whereas merging unordered lists of vectors is less (e.g., significantly less) computationally expensive. Furthermore, if the number of vectors 124 is relatively low, a brute force search can be as efficient as graph search because the brute force search has a locality of reference that is advantageous as compared to a graph search. In some examples, the search system 100 may delay building a graph structure until a brute force search becomes too expensive. In some examples, as further discussed below, the indexing strategy selector 114 may adjust an indexing strategy 180 based on the data characteristics. In some examples, the indexing strategy selector 114 may adjust the indexing strategy 180 when merging immutable segments (e.g., before, during, or after merging immutable segments).

An optimal indexing strategy 180 may depend on one or more system constraints 178. The system constraints 178 include the required queries per second (QPS), maximum latency, memory availability and/or data scale (e.g., the number of vectors and their dimension). For example, graph based data structures may allow for fast queries at large scale but may be slow to build, and, in some examples, may require that each vector be stored in memory because they read vectors at random. Quantizing vectors may reduce memory but may require additional retrieval and ranking of vectors 124 to achieve high recall, which may slow down queries particularly if they require relatively high recall. Storing vectors 124 in floating point precision and/or as a contiguous block of memory address (flat in memory) may provide fast times for building and merging vectors 124 but may require a relatively large amount of memory space and the query time may be linear in the index size. If a vector index is built sequentially in immutable segments, when segments are merged, a system can modify the way the vectors 124 are indexed without incurring additional overhead (e.g., the index may be rebuilt at these points anyway).

The search system may define an indexing strategy preference based on the following list of index strategies 180: 1) flat floating point vectors denoted S(flat, f32), 2) flat b bit scalar quantized with higher bit counts preferred S(flat, ib), 3) HNSW floating point vectors S(HNSW,f32), 4) HNSW b bit scalar quantized with higher bit counts preferred S(HNSW, ib), and 5) IVF with product quantization S(IVF, PQ).

For each index strategy 180, the indexing strategy selector 114 may compute an implied QPS, latency and memory usage as a function of vector count n and dimension d, which are represented by q(·|, d), l(·|n, d) and m(·|n, d), respectively. In some examples, the QPS, latency, and memory usage are functions of the compute environment used by the index.

Typically, the characteristics of the compute environment are known in advance and can be used to parameterize these functions. Multiple index strategies 180 could be used for this, but in general, the indexing strategy selector 114 may learn a model (e.g., a machine-learning model), which predicts each quantity, e.g., QPS, latency, and memory usage. The query latency for S(flat, f32) may be a linear function of the product of n and d. Specifically, for the term l(S(flat, f32), |n, d)=c X nd, the indexing strategy selector 114 may estimate c for the compute environment and store that information with the index.

After obtaining QPS $q_{min}$ and query latency $l_{max}$, and available RAM $m_{max}$. When the search system merges segments, the search system 100 has a new vector count $n=\Sigma_i n_i$, which the indexing strategy selector 114 uses to reassess the indexing strategy 180. In some examples, the indexing strategy selector 114 may evaluate the above indexing strategies 180 in descending preference order, and, in response to achieving $Q(S|n, d) \geq q_{min}$, $l(S|n, d) \leq l_{max}$ and $m(S|n, d \leq m_{max}$, the indexing strategy selector 114 may select one of the indexing strategies 180 for the merged segment 131*a*. If the indexing strategy selector 114 determines that the memory usage is equal or greater than a memory usage threshold, the indexing strategy selector 114 may select an indexing strategy 180 of S(IVF, PQ). If the indexing strategy selector 114 determines that the memory usage is less than the memory usage threshold, the indexing strategy selector 114 may select an indexing strategy 180 that minimizes the percentage miss in QPS and latency.

Below is an example of an algorithm 1 that selects a vector index strategy at segment merge according to an aspect.

Algorithm 1

MERGED-SEGMENT-STRATEGY ($\{n_i\}$, d)
Input:
  the segment vector counts $\{n_i\}$
  the vector dimension d
Output:
  the index strategy to use for the merged segment $$n \leftarrow \sum_i n_i$$

miss ← ∞ // the relative miss of constraint

-continued

Algorithm 1

F ← S(IVF, PQ) // the fallback strategy
for S ∈ (S(flat, f32), S(flat, i8), S(flat, I8), S(HNSW, f32), S(HNSW, i4), S(IVF, PQ))
  if $q(S|n, d) \geq q_{min}$ and $I(S|n, d) \leq l_{max}$ and $m(S|n, d) \leq m_{max}$
    return S
  if $m(S|n, d \leq m_{max}$ $$cand \leftarrow \frac{q(S|n, d)}{q_{min}} + \frac{l[(S|n, d)}{l_{max}}$$

if cand < miss
    miss ← cand
    F ← S

In some examples, the search system 100 discussed herein provides an algorithm to efficiently search multiple graphs 122 (e.g., HNSW graphs) at least partially in parallel. For example, multiple graphs 122 may represent an index or multiple indexes (e.g., index information 120). A first graph may include a number of nodes, node attributes, and edges and their properties. A second graph may include a number of nodes, node attributes, and edges and their properties. For example, the search and index tier may include a multigraph searcher 104 configured to efficiently execute a search on multiple graphs 122. In some examples, the search system 100 includes a graph merging engine 116 configured to efficiently merge multiple graphs 122 (e.g., HNSW graphs). Searching a single graph may be more efficient in terms of computing power than searching n graphs independently because of a search pruning heuristic used by a graph. If a direction in the graph is not competitive with the kth match (found so far), in some examples, a search system may not explore that direction. With one graph, a global top-k set is used. With multiple graphs, a top-k set per graph is used. In some examples, where an adversary has arranged the data between segments by clustering, top-k matches (e.g., all top-k matches) may come from one graph, and using n graphs may result in using n times more computing power than a single graph.

Figure 5:
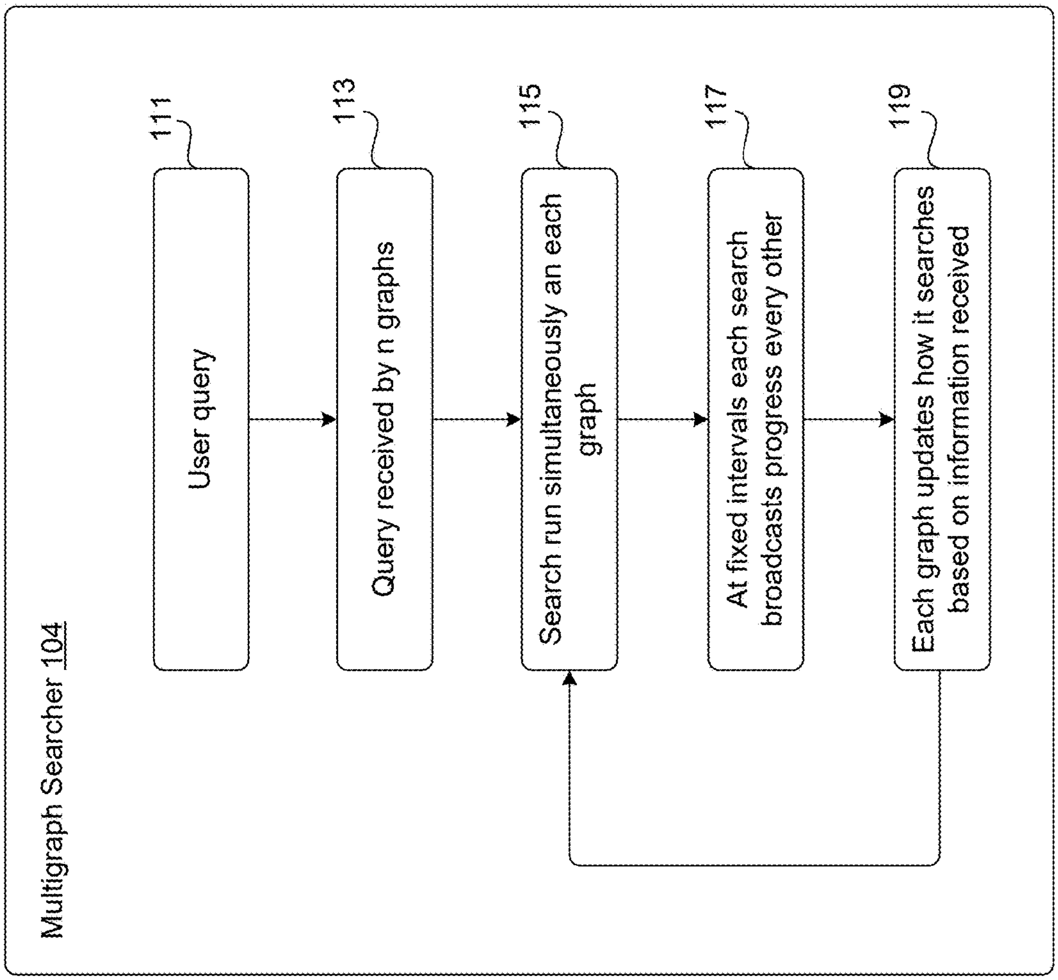
FIG. 5 illustrates an example of a multigraph searcher according to an aspect.

The multigraph searcher 104 may implement techniques that share state information between graphs 122 to reduce the cost of searching non-competitive directions in a given graph 122. FIG. 5 illustrates an example of the multigraph searcher 104. For example, in operation 111, the multigraph searcher 104 receives a user query. In operation 113, a query is received by a number of graphs 122. In operation 115, the multigraph searcher 104 may execute a search (simultaneously) on each graph 122. In operation 117, at fixed intervals, each search broadcasts its progress. In operation 119, each graph 122 updates how it searches based on information received.

For example, a search (e.g., a HNSW search) may traverse (e.g., only traverses) edges of the graph 122 if their end vertex's vector is competitive. In some examples, a search layer routine may obtain and store a set of matches $e_f$ (e.g., closest neighbors to the query). If the end vertex of an edge is further from the query vector 176 than the furthest vector in this set, the search system 100 may terminate searching the graph 122 in that direction. This parameter may control exploration in the search. At each step, since a search system 100 may select the vertex closest to a query not visited, a value of one may indicate the search explores the path along which distance to the query decreases fastest (e.g., a fully greedy algorithm). Conversely, a value of infinity (e.g., ∞) may indicate that a search system 100 may eventually explore the whole graph. The smaller the value $e_f$ the faster the search, but the greater the chance the search may be fixed in a local minimum. In some examples, there is no approximation bound associated with a stopping condition used by HNSW. In some examples, the search system 100 reaches the global nearest vectors with high probability a suitable value for $e_f$.

As discussed herein, the multigraph searcher 104 may dynamically reduce $e_f$ for graphs 122 where the search is not currently globally competitive. In some examples, the multigraph searcher 104 may manage two priority queues, e.g., a first priority queue and a second priority queue. The first priority query may be a queue that is shorter than the second priority queue. In some examples, the multigraph searcher 104 may prune globally non-competitive matches using the short queue. In some examples, the multigraph searcher 104 uses a soft search stop based on the other graphs' search state.

A full layer search routine is depicted in Algorithm 2 below.

Algorithm 2

```
SEARCH-LAYER (q, E_p, Ø_f, g, l_f)
Input:
   Query element q,
   Set of enter points E_p,
   Number of nearest neighbors to q to return e_f,
   Greediness of globally non-competitive search g ∈ (0,1]
   Layer number l_f
Output:
e_f closest neighbors to q
V ← E_p // set of visited vertices
C ← E_p // set of candidates
W ← E_p // dynamic list of found nearest neighbors
W_g ← nearest min((1 − g)e_f , |E_p|), elements from E_p to q
W_glob ← Ø // the global nearest neighbor set of size at most e_f
while |C| > 0
   c ← nearest nelement from C to q
   f ← get further element from W to q
   if dist(c, q) > dist(f, q)
   Break
For each Ø ∈ V
   V ← V ∪ (e)
   f ← furtherest element to q in W
   f_g ← furtherst element to q to W_g
   f_glob ← furthest element to q in W_glob or a point at ∞ if i'empty
if (|W| < Ø_f or dist(e, q) < dist (f, Jq)) and
   (|W_g| < (1 − g)e_f or dist (e, q) < dist(f_s, q)or dist (e, q) < dist (f_glob, q)
   C ← C ∪ (e)
   W ← W ∪ (e)
   if dist (e, q) < dist (f_ø, q)
   W_g ← W_g ∪ (e)
   Remove further element from W to q to |W| > e_f
   Remove furthest element from W_g to q if |W_g| > (1 − g)e_f
   Periodically update W_glob with the delta in W
Update W_glob with the delta in W.
```

In some examples, the multigraph searcher 104 may synchronize processes (e.g., all processes) at the point at which they share information. Synchronizing the processes at the point at which they share information may provide a balance in a tradeoff in performance for the sharing frequency (e.g., sharing information more frequently may cause the graph searches to execute more efficiently but with an increase in contention).

In some examples, the multigraph searcher 104 may use message passing, where each process maintains its own copy of $W_{glob}$ and is reminiscent of opportunistic concurrency. Messages of the change in the nearest neighbor set are periodically broadcast from each process to all others, at iterations pi for $i \in [n]$ and period p, in the loop. These are tagged with their period i. A special search complete message is passed when a search exits. Loops (e.g., all loops) start to use information with tag i only after they reach iteration pi+[fp]f or $f \in [0,1)$. If a process has not received information from all processes tagged with either period i or end of search when it reaches iteration pi+[fp], it waits until it does. Provided the discrepancy in progress is always less than [fp] no process should ever wait. By only counting iterations which do not skip visited vertices, each loop iteration performs approximately the same amount of work. In some examples, each process may share new information with the others as soon as it has it by updating $W_{glob}$ when it finds a new nearer element. Here, $(1-g)e_f$ is at least 1.

Figure 6A:
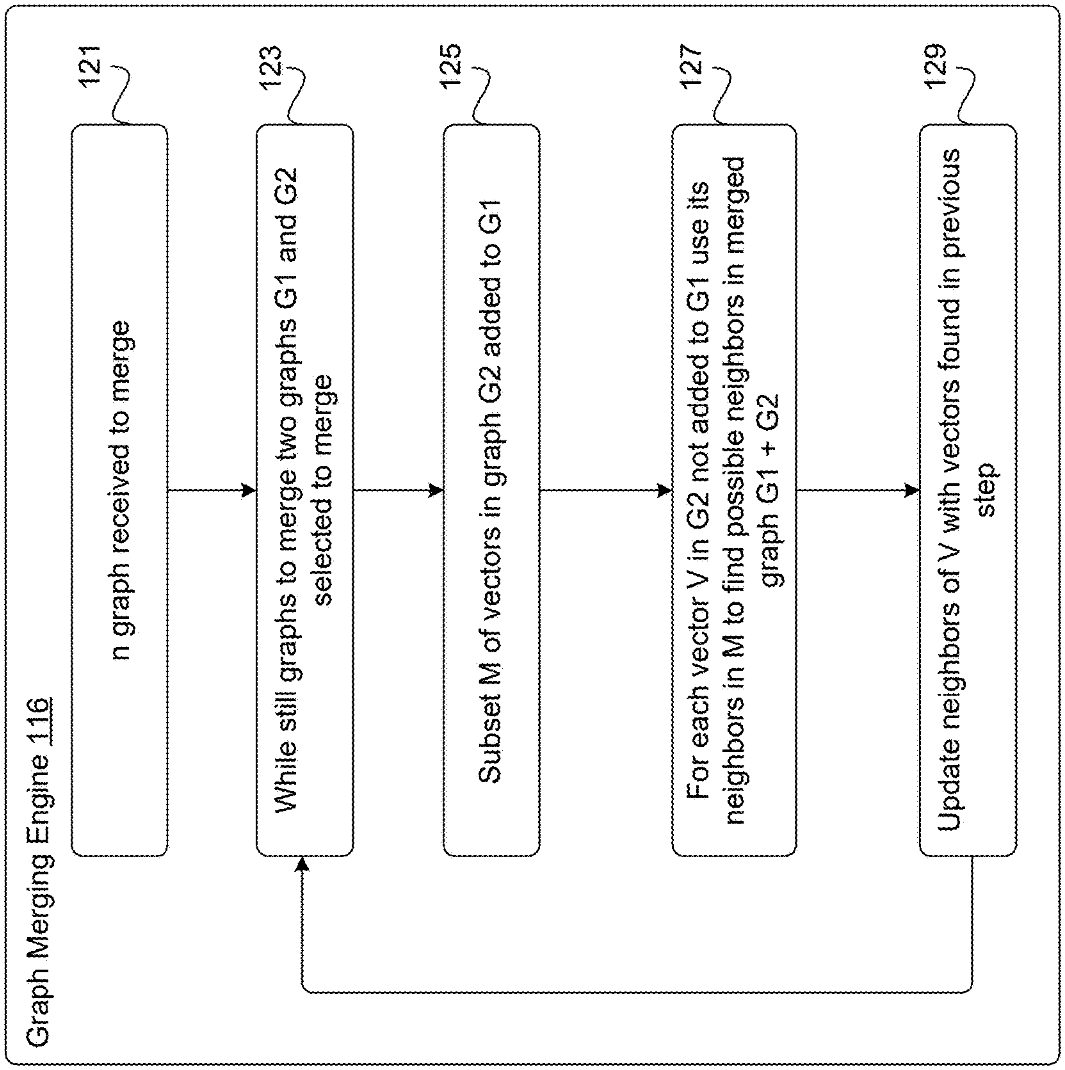
FIG. 6A illustrates a graph merging engine according to an aspect.
Figure 6B:
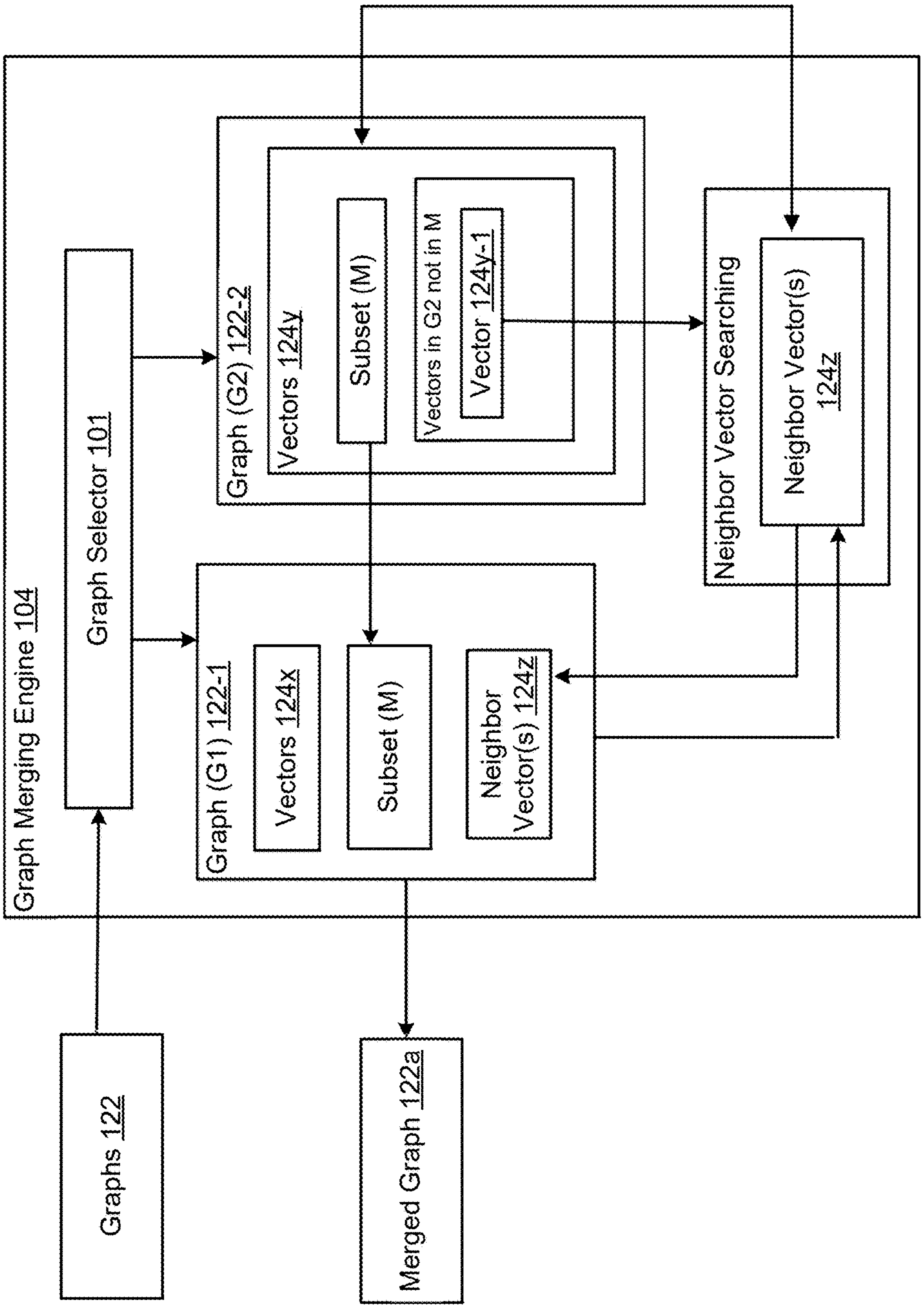
FIG. 6B illustrates a graph merging engine according to another aspect.

The graph merging engine 116 may reduce the cost of merges by using the small graph connectivity to avoid inserting vectors 124 in the small graph into the large one. FIGS. 6A and 6B illustrate an example of a graph merging engine 116. In operation 121, the graph merging engine 116 receives n graphs 122 to merge, and, in operation 123, the graph merging engine 116 selects two graphs, e.g., graph 122-1 (G1) and graph 122-2 (G2). The graph 122-1 includes vectors 124*x*. The graph 122-2 includes vectors 124*y*. In operation 125, the graph merging engine 116 adds a subset (M) of vectors 124*y* from the graph 122-2 to the graph 122-1. In operation 127, for a vector 124*y*-1 (e.g., each vector) in the graph 122-2 not added to graph 122-1, the graph merging engine 116 uses neighbors of the vector 124*y*-1 in the subset (M) to find neighbor vectors 124*z* in the graph 122-1 and the graph 122-2. Operation 129 includes updating neighbor vectors with vectors found in operation 127. The neighbor vectors 124*z* are added to the graph 122-1, and then the graph 122-1 is outputted as a merged graph 122*a*.

For example, the graph merging engine 116 may implement a fast merge algorithm for two graphs $G_s$ and $G_l$. The layer assignment of vectors 124 in a graph 122 (e.g., every graph 122) follows the same distribution or substantially the same distribution. Therefore, the search system 100 may retain the current layer assignment of vertices in both graphs 122. In some examples, we assume without loss of generality that $|G_s| \le |G_l|$. In some examples, it may be more efficient to merge the small graph into the large one. In some examples, adding vertices in $G_s$ one at a time has complexity of $$O(|G_s|\log(|\overline{G_l}|))^{\wedge}1).$$

The graph merging engine 116 may merge two single layer or NSW graphs 122 based on a location of where to insert a vertex v. For example, if the graph merging engine 116 determines the location of where to insert a vertex v, the graph merging engine 116 can estimate locations of where to insert its neighbor vectors 124*z*. The neighbors of a vertex v in a graph $G_i$ may be denoted by $N_i(v)$ and $G_s$ indicates the vertices of $G_s$.

The graph merging engine 116 may proceed with the following stages. In a first stage (step 1), the graph merging engine 116 finds $J \sqsubset G_s$ which is inserted into the corresponding layer of $G_l$ using COMPUTE-JOIN-SET (described below). In a second stage (step 2), the graph merging engine 116 inserts each vertex $v \in J$ into $G_l$. In a third stage (step 3), for each vertex $u \in G_s \backslash J$, the graph merging engine 116 finds $J \cap G_s(u)$, finds $E_u = \cup_{v \in J \cap N_s(u)} N_l(v)$, sets $C = N_s(u) \cap E_u$ and runs SELECT-NEIGHBORS-HEURISTIC for u using this candidate set.

For every vertex in $u \in U$, the graph merging engine 116 has $|J \cap N_s(u)| \geq k$ for some small $k<M$, the layer connectivity. In some examples, the graph merging engine 116 uses $M \in [5,48]$ with higher values better for high dimensional data and the default Lucene chooses is $M=16$. (Note that the bottom layer has vertices up to twice this degree.) In some examples, $k=4$.

The graph merging engine 116 may select vertices in J in a manner to achieve roughly $\mathbb{E}[|J \cap N_s(u)|]=M|J]/(|G_s|-|J|)$. The graph merging engine 116 may expect $$|J| = \frac{k}{M+k}|G_s|,$$

which may anow the analysis of the complexity of the above approach.

In some examples, step 1 examines (e.g., only examines) the graph connectivity and computes no dot products. The graph merging engine 116 may use one or more different strategies, including a simple greedy approach discussed below, which may be around $O(|J| \log(|G_s|))$.

In some examples, for step 2, the graph merging engine 116 computes $$\frac{k}{M+k}|G_s| = \frac{4}{20}|G_s| = |G_s|/5$$

inserts into $G_l$, but with a reduced computational cost.

In some examples, step 3 has complexity $O(|G_s|)$, since $$|U| \approx \frac{4}{5}|G_s|$$

can be obtained. In some examples, the graph merging engine 116 may iterate $u \in G_s \setminus J$ using a graph traversal, which may provide a better locality of reference than step 2 (e.g., since neighbors are likely to share neighbors), thereby providing increased cache performance and lower constants. Provided the constants for steps 1 and 3 are less than step 2, this process yields an increased speed as compared to some conventional approaches.

With respect to step 1, the graph merging engine 116 may select vertices and increment a count at their neighbors, which are not already in J (e.g., instead of selecting edges). If the count at a vertex v is denoted by c(v), then the gain from adding a vertex to J is:

$$\max(k-c(v), 0) + \sum_{u \in N_s(v) \setminus J} 1\{c(u) < k\} \quad \text{Eq. (14)}$$

Figure 6C:
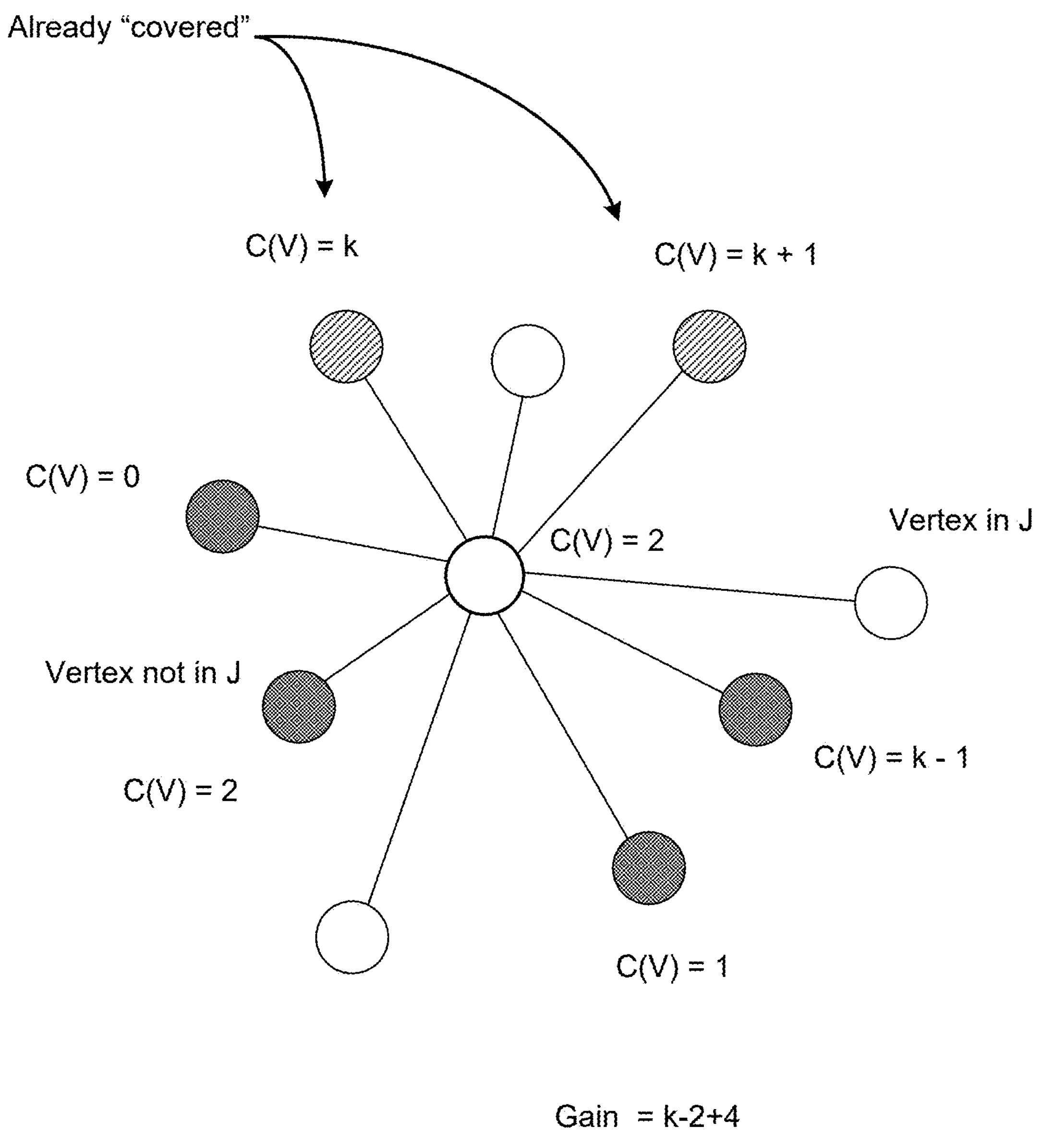
FIG. 6C depicts an illustration of a gain calculation from adding a vertex to a join set according to an aspect.

The parameter $1\{\cdot\}$ denotes the indicator function. Note that this includes the change in the count of the vertex added to J, e.g., mark(k−c(v), 0). FIG. 6C illustrates a gain calculation from adding a vertex to the join set.

Each vertex has the following state: 1) whether it is stale, 2) its gain, 3) the count of adjacent vertices not in J, 4) its count, and 5) a random number in the range [0,1] which is used for tie breaking. In some examples, vertices' states (e.g., all vertices' states) are initialized with "is stale" false, gain equal to "vertex degree"+k, count of adjacent vertices not in J equal to "vertex degree" and count equal to 0. The vertices are inserted into a priority queue ordered by gain (with ties broken first by count of adjacent vertices not in J then at random). For each iteration a vertex v is popped. If the gain is not stale, it is added to J, otherwise its gain is recomputed, and it is added back into the priority queue if its gain is greater than zero. Its neighbors' counts are incremented by 1. Then, all neighbors of a vertex whose count increased to k in the iteration are marked as stale.

An algorithm 3 is provided below.

Algorithm 3

```
COMPUTE-JOIN-SET (G_s, k)
Input:
  Small graph to join G_s
  Required coverage k
Output:
  the vertices in G_s to join J
C ← Ø
For v in G_s
  C ← C ∪ [(flase, deg(v) + k, deg(v), 0, r and(0,1))]
g_tot ← 0
while g_tot < k|G_s|
  v ← maximum gain node in c (see tie breaking logic above)
  C ← C\{v}
  if gain of v is not stale
  J ← J ∪ {v}
  g_tot ← g_tot + gain of v
  mark neighbors of v stale if c(v) < k
  for u ∈ N_s(v)
  mark neighbors of u stale if c(u) = k − 1
  c(u) ← c(u) + 1
else
  gain ← max(k − c(v), 0) + Σ_{u∈N_s(v)\J} 1{c(u) < k}
  if gain > 0
  C ← C ∪ {(false,gain,|N_s(v)\J|, c(v), rand90,1))}
Return J
```

The graph merging engine 116 may determine and store the total gain to determine when to stop. In response to the total gain being equal to a threshold level (e.g., $k|G_s|$), the graph merging engine 116 determines to stop the compute-join-set operation. In some examples, the graph merging engine 116 does not add a vertex to J with zero gain. Because gains decrease, stale gains are an upper bound on the vertices' current gains and the first vertex we pop which is not stale has the highest gain of any remaining vertex. This has complexity at least $O(|J| \log(|G_s|))$, but the constants are different to step 2, and may be lower.

The search system 100 may include one or more processors and one or more memory devices. The processor(s) may be formed in a substrate configured to execute one or more machine executable instructions or pieces of software, firmware, or a combination thereof. The processor(s) can be semiconductor-based—that is, the processors can include semiconductor material that can perform digital logic. The memory device(s) may include a main memory that stores information in a format that can be read and/or executed by the processor(s). The memory device(s) may store the search and index tier 101, when executed by the processors, perform certain operations discussed herein. In some examples, the memory device(s) includes a non-transitory computer-readable medium that includes executable instructions that cause at least one processor to execute operations.

In some examples, the search system 100 may execute on one or more server computers 160. The client devices 130 may communicate with the search system 100 over a network. The server computer(s) 160 may be computing devices that take the form of a number of different devices, for example a standard server, a group of such servers, or a rack server system. In some examples, the server computer may be a single system sharing components such as processors and memories. The network may include the Internet and/or other types of data networks, such as a local area network (LAN), a wide area network (WAN), a cellular network, satellite network, or other types of data networks. The network may also include any number of computing devices (e.g., computers, servers, routers, network switches, etc.) that are configured to receive and/or transmit data within the network. Network may further include any number of hardwired and/or wireless connections.

Figure 7:
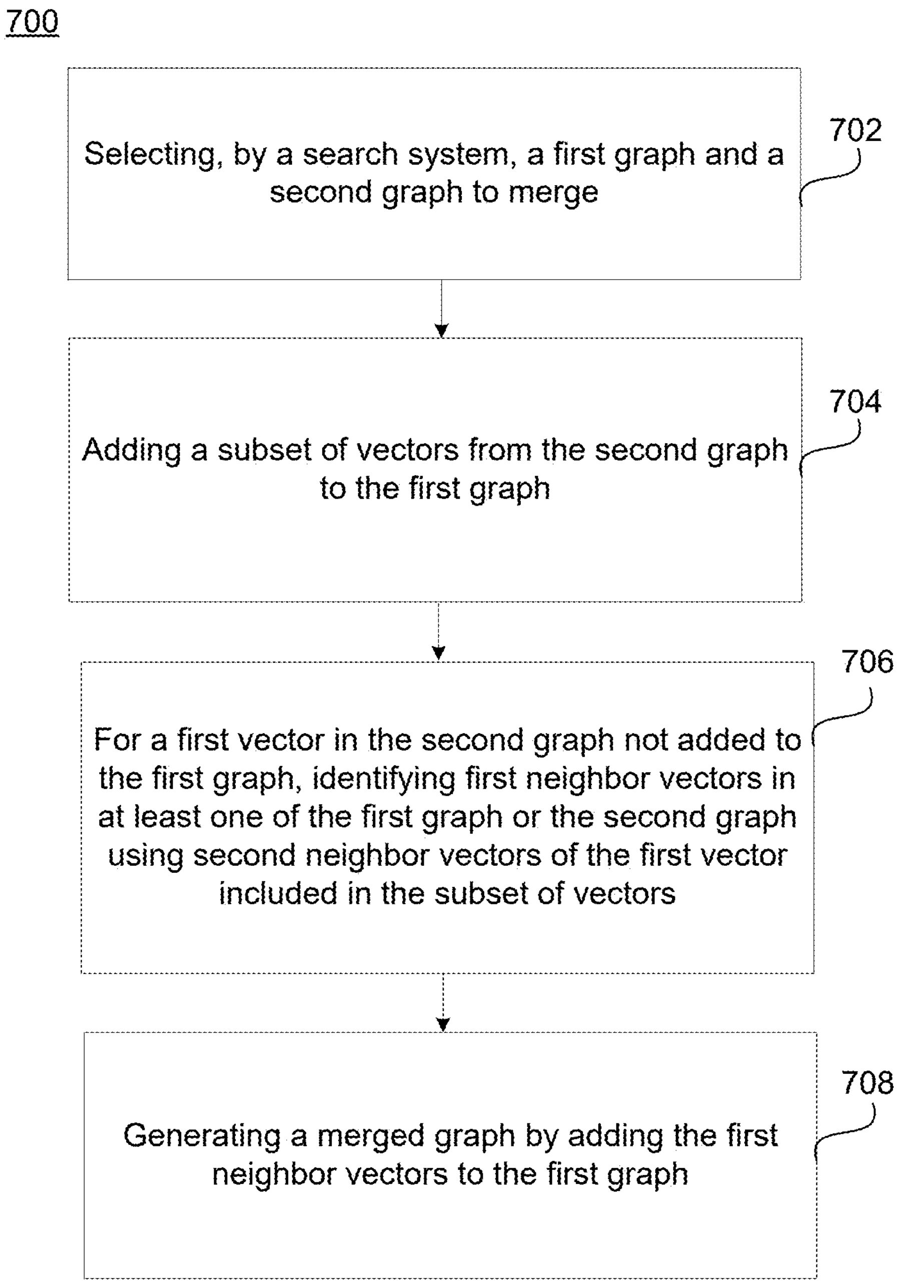
FIG. 7 illustrates a flowchart depicting example operations of graph merging according to an aspect.

FIG. 7 is a flowchart 700 depicting example operations of a system for merging graphs according to an aspect. The flowchart 700 may depict operations of a computer-implemented method. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion.

Operation 702 includes selecting, by a search system, a first graph and a second graph to merge. Operation 704 includes adding a subset of vectors from the second graph to the first graph. Operation 706 includes, for a first vector in the second graph not added to the first graph, identifying first neighbor vectors in at least one of the first graph or the second graph using second neighbor vectors of the first vector included in the subset of vectors. Operation 708 includes generating a merged graph by adding the first neighbor vectors to the first graph.

Clause 1. A method comprising: identifying, using an optimization solver, one or more quantization constants for quantizing a vector in a graph of a search system; generating a quantized vector of the vector using the quantization constants.

Clause 2. A method comprising: computing a similarity distance between a first quantized vector and a second quantized vector stored in a search system; estimating an error approximation based on metadata associated with the first quantized vector and metadata associated with the second quantized vector; and updating the similarity distance based on the error approximation.

Clause 3. A method comprising: receiving vector segments to merge; receiving one or more system constraints; identifying an indexing strategy based on the one or more system constraints; and generating a merged segment for the vector segments using the indexing strategy.

Clause 4. A method comprising: receiving a user query for a vector search on a first graph and a second graph; executing a first search on the first graph and a second search on the second graph; at an interval, broadcasting a first message about the first search to the second graph and broadcasting a second message about the second search to the first graph; and updating the first search and the second search based on the second message and the first message, respectively.

Clause 5. A method comprising: identifying a first graph and a second graph to merge; adding a subset of vectors from the second graph to the first graph; for a first vector in the second graph not added to the first graph, identify neighbor vectors in the first graph and the second graph using neighbors of the first vector included in the subset; and adding the neighbor vectors to the first graph.

Clause 1. A method comprising: selecting, by a search system, a first graph and a second graph to merge; adding a subset of vectors from the second graph to the first graph; for a first vector in the second graph not added to the first graph, identifying first neighbor vectors in at least one of the first graph or the second graph using second neighbor vectors of the first vector included in the subset of vectors; and generating a merged graph by adding the first neighbor vectors to the first graph.

Clause 2. The method of clause 1, further comprising: in response to a user query received from a user device, searching the merged graph for data that is responsive to the user query.

Clause 3. The method of clause 1, wherein the second graph is a size that is smaller than the first graph.

Clause 4. The method of clause 1, wherein the first graph represents first indexing information, and the second graph represents second indexing information:

Clause 5. The method of clause 1, wherein the first neighbor vectors are identified without using dot product calculations.

Clause 6. The method of clause 1, further comprising: computing a gain value of a vector from the subset of vectors that was added to the first graph; and determining whether to add a subsequent vector to the first graph based on the gain value.

Clause 7. An apparatus comprising: at least one processor; and a non-transitory computer-readable medium storing executable instructions that when executed by the at least one processor cause the at least one processor to: select, by a search system, a first graph and a second graph to merge; add a subset of vectors from the second graph to the first graph; for a first vector in the second graph not added to the first graph, identify first neighbor vectors in at least one of the first graph or the second graph using second neighbor vectors of the first vector included in the subset of vectors; and generate a merged graph by adding the first neighbor vectors to the first graph.

Clause 8. The apparatus of clause 7, wherein the executable instructions include instructions that cause that least one processor to: in response to a user query received from a user device, search the merged graph for data that is responsive to the user query.

Clause 9. The apparatus of clause 7, wherein the second graph is a size that is smaller than the first graph.

Clause 10. The apparatus of clause 7, wherein the first graph represents first indexing information, and the second graph represents second indexing information.

Clause 11. The apparatus of clause 7, wherein the first neighbor vectors are identified without using dot product calculations.

Clause 12. The apparatus of clause 7, wherein the executable instructions include instructions that cause that least one processor to: compute a gain value of a vector from the subset of vectors that was added to the first graph; and determine whether to add a subsequent vector to the first graph based on the gain value.

Clause 13. A non-transitory computer-readable medium storing executable instructions that cause at least one processor to execute operations, the operations comprising: selecting, by a search system, a first graph and a second graph to merge; adding a subset of vectors from the second graph to the first graph; for a first vector in the second graph not added to the first graph, identifying first neighbor vectors in at least one of the first graph or the second graph using second neighbor vectors of the first vector included in the subset of vectors; and generating a merged graph by adding the first neighbor vectors to the first graph.

Clause 14. The non-transitory computer-readable medium of clause 13, wherein the operations further comprise: in response to a user query received from a user device, searching the merged graph for data that is responsive to the user query.

Clause 15. The non-transitory computer-readable medium of clause 13, wherein the second graph is a size that is smaller than the first graph.

Clause 16. The non-transitory computer-readable medium of clause 13, wherein the first graph represents first indexing information, and the second graph represents second indexing information.

Clause 17. The non-transitory computer-readable medium of clause 13, wherein the first neighbor vectors are identified without using dot product calculations.

Clause 18. The non-transitory computer-readable medium of clause 13, further comprising: computing a gain value of a vector from the subset of vectors that was added to the first graph; and determining whether to add a subsequent vector to the first graph based on the gain value.

Clause 19. A method comprising: receiving, from a user device, a user query for a vector search on indexing information, the indexing information including a first graph and a second graph; executing a first search on the first graph and a second search on the second graph; at an interval, broadcasting a first message about the first search to the second graph and broadcasting a second message about the second search to the first graph; and updating the first search and the second search based on the second message and the first message, respectively.

Clause 20. The method of clause 19, wherein the first search is executed at least partially in parallel with the second search.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., an OLED (Organic light emitting diode) or LCD (liquid crystal display) monitor) for displaying information to the user and a keyboard and a pointing device (e.g., a mouse or a trackball) by which the user can provide input to the computer. Alternatively, this can be implemented with a 3D user interaction system making use of trackers that are tracked in orientation and 3D position. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship with each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art. Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method comprising:

selecting, by a search system, a first graph and a second graph to merge, the first and second graphs being separate database indexes storing vectors generated by a model to represent data uploaded to the search system;

adding a subset of vectors from the second graph to the first graph to form a join set based on gain values for vectors in the second graph;

for a first vector in the second graph not added to the first graph, identifying first neighbor vectors in at least one of the first graph or the second graph using second neighbor vectors of the first vector included in the join set, the first neighbor vectors being identified by incrementing a count at the second neighbor vectors without using dot product calculations;

determining whether a count of a neighbor vector of a vector in the second graph achieves a coverage parameter;

in response to determining the count has achieved the coverage parameter, recomputing a gain value for the vector in the second graph prior to determining whether to add the vector to the join set;

generating a merged database index by adding the first neighbor vectors to the first graph; and in response to a client query from a user device, obtaining search results by searching the merged database index to identify data responsive to the client query.

2. The method of claim 1, wherein the second graph has a size that is smaller than the first graph, wherein adding the subset of vectors from the second graph to the first graph includes terminating addition of the vectors from the second graph to the first graph in response to the gain values achieving a threshold level.

3. The method of claim 1, further comprising:

computing the gain value for the vector in the second graph based on a vertex degree of the vector and a layer connectivity parameter.

4. The method of claim 1, wherein the separate database indexes are Hierarchical Navigable Small World (HNSW) graphs.

5. The method of claim 1, wherein the first graph and the second graph are multi-layered graphs, and wherein generating the merged database index includes maintaining a current layer assignment of respective vectors in the first graph and the second graph.

6. The method of claim 1, further comprising:

determining a new vector count based on the merged database index;

evaluating a plurality of indexing strategies based on the new vector count and one or more system constraints; and applying a selected indexing strategy from the plurality of indexing strategies to the merged database index based on the evaluation.

7. The method of claim 1, wherein obtaining the search results by searching the merged database index includes evaluating vectors in the merged database index using a global top-k set as a search pruning heuristic.

8. An apparatus comprising:

at least one processor; and a non-transitory computer-readable medium storing executable instructions that when executed by the at least one processor cause the at least one processor to:

select, by a search system, a first graph and a second graph to merge, the first and second graphs being separate database indexes storing vectors generated by a model to represent data uploaded to the search system;

add a subset of vectors from the second graph to the first graph to form a join set based on gain values for respective vectors in the second graph;

for a first vector in the second graph not added to the first graph, identify first neighbor vectors in at least one of the first graph or the second graph using second neighbor vectors of the first vector included in the join set, the first neighbor vectors being identified by incrementing a count at the second neighbor vectors without using dot product calculations;

determine whether a count of a neighbor vector of a vector in the second graph achieves a coverage parameter;

in response to determining the count has achieved the coverage parameter, recompute a gain value for the vector in the second graph prior to determining whether to add the vector to the join set;

generate a merged database index by adding the first neighbor vectors to the first graph; and in response to a client query from a user device, obtain search results by searching the merged database index to identify data responsive to the client query.

9. The apparatus of claim 8, wherein the second graph has a size that is smaller than the first graph, wherein the executable instructions to add the subset of vectors from the second graph to the first graph include terminating addition of the vectors from the second graph to the first graph in response to the gain values achieving a threshold level.

10. The apparatus of claim 8, wherein the executable instructions include instructions that cause the at least one processor to:

compute the gain value for the vector in the second graph based on a vertex degree of the vector and a layer connectivity parameter.

11. A non-transitory computer-readable medium storing executable instructions that cause at least one processor to execute operations, the operations comprising:

selecting, by a search system, a first graph and a second graph to merge, the first and second graphs being separate database indexes storing vectors generated by a model to represent data uploaded to the search system;

adding a subset of vectors from the second graph to the first graph to form a join set based on gain values for respective vectors in the second graph;

for a first vector in the second graph not added to the first graph, identifying first neighbor vectors in at least one of the first graph or the second graph using second neighbor vectors of the first vector included in the join set, the first neighbor vectors being identified by incrementing a count at the second neighbor vectors without using dot product calculations;

determining whether a count of a neighbor vector of a vector in the second graph achieves a coverage parameter;

in response to determining the count has achieved the coverage parameter, recomputing a gain value for the vector in the second graph prior to determining whether to add the vector to the join set;

generating a merged database index by adding the first neighbor vectors to the first graph; and in response to a client query from a user device, obtaining search results by searching the merged database index to identify data responsive to the client query.

12. The non-transitory computer-readable medium of claim 11, wherein the second graph has a size that is smaller than the first graph, wherein adding the subset of vectors from the second graph to the first graph includes terminating addition of the vectors from the second graph to the first graph in response to the gain values achieving a threshold level.

13. The non-transitory computer-readable medium of claim 11, wherein the operations further comprise:

computing the gain value for the vector in the second graph based on a vertex degree of the vector and a layer connectivity parameter.

* * * * *